United States Patent
Morgana

(10) Patent No.: US 8,392,454 B2
(45) Date of Patent: Mar. 5, 2013

(54) CONCORDANCE SEARCHING SYSTEMS AND METHODS

(75) Inventor: Stephen C. Morgana, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1464 days.

(21) Appl. No.: 11/683,456

(22) Filed: Mar. 8, 2007

(65) Prior Publication Data

US 2008/0222099 A1    Sep. 11, 2008

(51) Int. Cl.
G06F 7/00    (2006.01)
G06F 17/30   (2006.01)

(52) U.S. Cl. ........................................ 707/776
(58) Field of Classification Search ............... 707/3, 776
See application file for complete search history.

(56) References Cited

U.S. PATENT DOCUMENTS

| | | | |
|---|---|---|---|
| 5,825,943 A | 10/1998 | De Vito et al. | |
| 5,871,238 A | 2/1999 | Furniss | |
| 5,933,822 A * | 8/1999 | Braden-Harder et al. | 707/5 |
| 6,032,004 A | 2/2000 | Mirabella, Jr. et al. | |
| 6,681,219 B2 * | 1/2004 | Aref | 707/3 |
| 6,907,562 B1 | 6/2005 | Schuetze | |
| 6,993,475 B1 | 1/2006 | McConnell et al. | |
| 7,287,214 B1 * | 10/2007 | Jenkins et al. | 715/205 |
| 2005/0243369 A1 | 11/2005 | Goldstein et al. | |
| 2006/0149558 A1 | 7/2006 | Kahn et al. | |
| 2007/0005566 A1 | 1/2007 | Bobick et al. | |
| 2007/0180471 A1 * | 8/2007 | Unz | 725/52 |

OTHER PUBLICATIONS

Kostoff, Ronald N., Rigsby, John T., and Ryan B. Barth. "Brief Communication Adjacency and proximity searching in the Science Citation Index and Google." Journal of Information Science 32, No. 6 (Dec. 2006): 581-587. Computers & Applied Sciences Complete, EBSCOhost.*
R. Goldman, N. Shivakumar, S. Venkatasubramanian, and H. Garcia-Molina, "Proximity Search in Da☐☐tabases," Proc. 24th Int'l Conf. Very Large Data Bases, pp. 26-37 Aug. 1998.*

* cited by examiner

Primary Examiner — Cheryl Lewis
Assistant Examiner — Mark Hershley
(74) Attorney, Agent, or Firm — Gibb & Riley, LLC

(57) ABSTRACT

Embodiments herein include a method of performing a computerized search of the electronic document based on a multi-term inclusive query supplied by the user. The process checks each search term match to determine if other terms in the query are in close enough proximity to allow the search term match to remain in the final search results that are eventually reported back to the user, even if such proximities span adjacent pages. More specifically, counts that span the adjacent pages comprise a count of items from a term on one page to a term on a second page adjacent to the first page so as to include a count of all terms between the terms in the counts that span adjacent pages of the printed publications.

13 Claims, 2 Drawing Sheets

CONCORDANCE SEARCHING SYSTEMS AND METHODS

BACKGROUND

Embodiments herein generally relate to systems that search electronic concordance documents and more particularly to systems and methods that allow searching of information in printed documents through a corresponding electronic concordance using multi-term inclusive queries, where the searching spans multiple pages of the printed documents.

In periodicals and books, related keywords may not appear on the same page, but may be split across adjacent pages. Presently, search engines such as Google.com and Amazon.com only present matches when the keywords all appear on the same printed page or web page. Therefore, conventional systems can sometimes miss matches that are in close proximity, but which appear on different pages.

SUMMARY

Embodiments herein include a method that begins by being provided with or accessing an electronic document comprising text and concordance data. The concordance data identifies locations where the text appears in printed publications, such as hard copies of books, pamphlets, newspapers, magazines, etc. Thus, the electronic document comprises an electronic form of hard copy, printed publication that is available for review/searching with a computer. Alternatively, the method can be used with non-hard copy documents, such as hyperlinked documents (e.g., hyperlinked web pages accessible on a storage medium or over the Internet or other network).

The method thus performs a computerized search of the electronic document based on a multi-term inclusive query supplied by the user. The multi-term inclusive query has at least two terms separated by an inclusive operator (such as spaces, Boolean operators, or other operators) that requires that at least two different terms be in the search result. The search engine produces preliminary search results referred to herein as "search term matches" that identify each individual occurrence of each search term within the multi-term search. These search term matches identify page locations within the printed publications (or hyperlinked document) where individual terms within the multi-term inclusive query appear. Thus, each "search term match" represents a single occurrence of only one term in the multi-term inclusive query. The process then checks each "search term match" to determine if other terms in the query are in close enough proximity to allow the search term match to remain in the final search results that are eventually reported back to the user. It should be noted that the method applies to each inclusive grouping of terms in a collection of disjunctive groups.

More specifically, the method determines whether the terms of each "search term match" are within "predetermined proximities" of other terms found in the multi-term inclusive query. As used herein, these predetermined proximities are defined as 1) a term within a search term match being on the same page of the printed publications as at least one of the other terms in the multi-term inclusive query and/or 2) the term within the search term match being within a predetermined number of pages of the printed publications of at least one of the other terms in the multi-term inclusive query.

If hyperlinked documents are being searched, these predetermined proximities are defined as 1) a term within a search term match being on the same hyperlinked page as at least one of the other terms in the multi-term inclusive query, and/or 2) the term within the search term match being within a predetermined number of hyperlink pages of at least one of the other terms in the multi-term inclusive query. Adjacent hyperlinked pages each have hyperlinks that directly link to each other, without linking to intervening pages. The hyperlink comprises a graphical item a user activates with a single user input action to move from one hyperlinked page to an adjacent hyperlinked page.

In alternative embodiments, the methods determine whether terms within the search term matches are within predetermined proximities of other terms in the multi-term inclusive query by determining whether the search term matches are within a predetermined count of the other terms in the multi-term inclusive query, where the count can count characters, words, paragraphs, etc. The counts span adjacent pages of the printed publications. More specifically, the counts that span the adjacent pages comprise a count of items from a term on one page to the beginning or end of that page, plus a count of items from a term on a second page adjacent to the first page to the beginning or end of the second page, so as to include a count of all terms between the terms in the counts that span adjacent pages of the printed publications.

The method then eliminates the search term matches that do not comprise terms that appear within the predetermined proximities from said preliminary search results to produce final search results, and reports the final search results.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
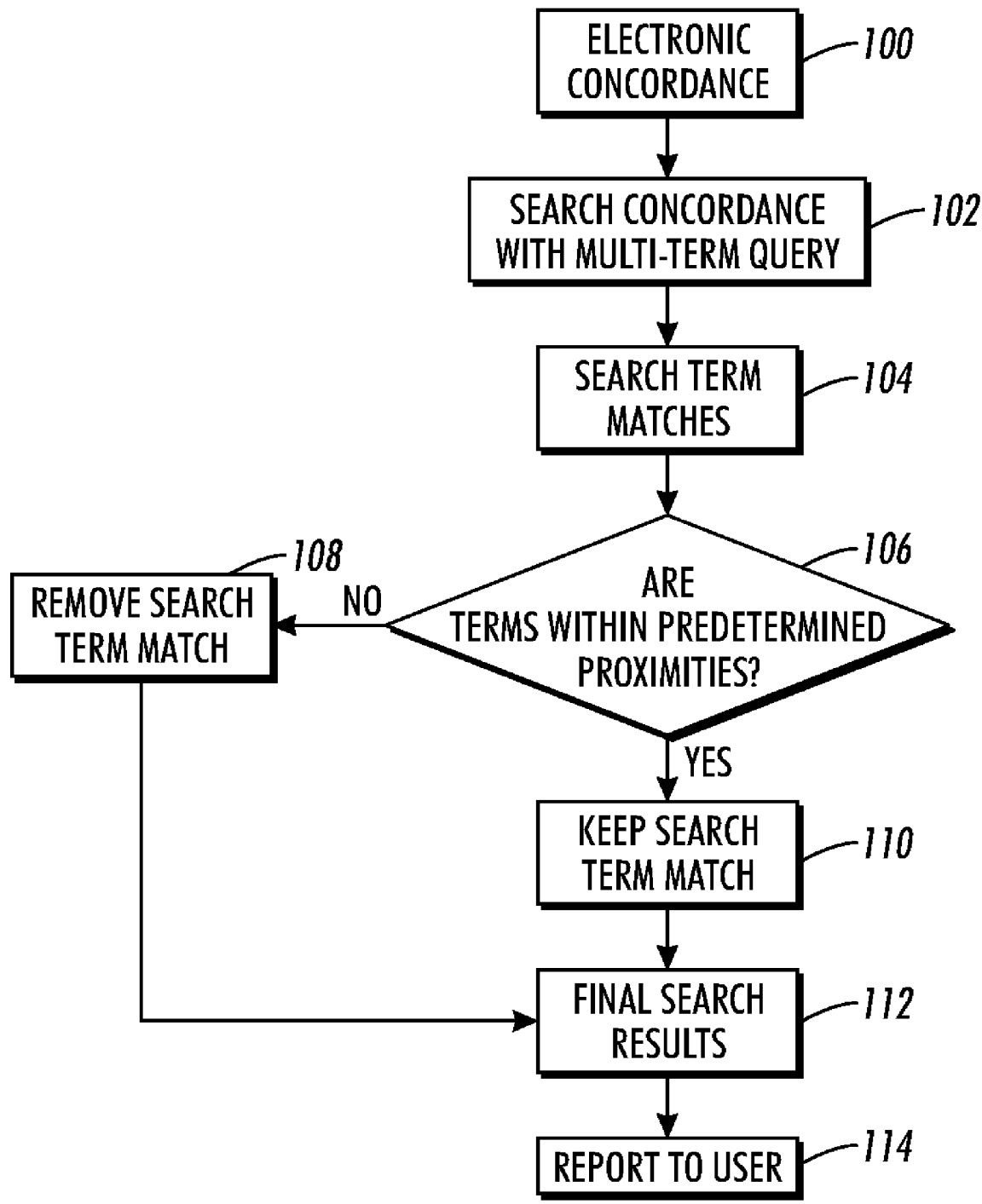
FIG. 1 is a flow diagram illustrating an embodiment herein.

Much information is still distributed in printed form, such as magazines, catalogs, newspapers and books. Manually searching through a stack of issues of a magazine for a topic of interest, or an article can be time consuming and difficult. The embodiments described herein allow searching of electronic concordance (which maps words in the material to the locations in the material where the words occur). Then users that have the printed material can do multiple keyword searches on their personal computer or other device to locate pages and lines of interest that can then be manually found in the material.

The concordance data identifies locations where the text appears in printed publications, such as hard copies of books, pamphlets, newspapers, magazines, etc. Examples of creating concordance information are discussed in U.S. Pat. No. 6,907,562, the complete disclosure of which is incorporated herein by reference. Thus, the electronic document comprises an electronic form of hard copy, printed publication that is available for review/searching with a computer. Alternatively, the method can be used with non-hard copy documents, such as network documents that are linked to each other (e.g., hyperlinked documents such as web pages accessible over the Internet, or other network).

Conventional electronic concordance searching is limited to the inclusive occurrence of different terms within a single printed page, as electronic concordance documents treat each printed page individually for searching purposes, because of the physically separate nature of each printed page. For example, U.S. Pat. No. 5,871,238, the complete disclosure of which is incorporated herein by reference, provides an electronic concordance that locates concordance topics and concordance references by page number. However, with embodiments herein, the searching can span one or more adjacent pages of the printed publication.

Similarly, U.S. Pat. No. 5,825,943 discloses methods for searching a text-image correspondence (TIC) table. In U.S. Pat. No. 5,825,943 a display of the portion of the page containing the search phrase is generated using the coordinates information. The search phrase is identified in the text data set. Then, the TIC table is used to identify the coordinates information corresponding to the search phrase. A display of the portion of the page containing the search phrase is generated using the coordinates information. The displayed portion may contain the phrase shown in a single page, or may be multiple portions of multiple pages, each page containing a portion of the search phrase. However, such conventional systems simply list out every page that contains one or more of the search terms regardless of the adjacency of the pages. Therefore, such systems are not as useful for multi-term searches of printed material where there may be only a paragraph or two per page and search terms may be split across multiple adjacent pages.

Thus, with embodiments herein an electronic concordance is generated for a document that contains each word in the document associated with each page number that the word appears on. When multiple keywords are searched for in the concordance, hits are generated for keywords on pages that intersect within one page of each other, e.g., a fuzzy intersection.

Looser matches can be provided with embodiments herein where hits are generated when keywords are within N pages of each other. The graphic user interface herein provides a page range for each hit. The user interface allows the user to specify exact, all on the same page, hits, or fuzzy hits. The embodiments herein also extend to loose hypertext searches where the fuzzy intersection allows keywords to span a page, and the pages that are hyperlinked to/and from the page where the word occurs. The concordance contains the keyword and the URL the word is found on, embodiments herein can provide groups of URLs involved in each hit.

As shown in FIG. 1, one embodiment herein begins by being provided with (or accessing) such an electronic document comprising text and concordance data, in item 100. The method then performs a computerized search of the electronic document based on a multi-term inclusive query supplied by the user in item 102. Search engines are well known, as exampled by U.S. Pat. No. 6,993,475, the complete disclosure of which is incorporated herein by reference.

One aspect of embodiments herein is the performance of searches of different terms occurring on at least two adjacent printed pages of the printed document and, therefore, the embodiments herein work with multi-term inclusive queries and with multi-page printed documents (or hyperlinked documents). As used herein a "term" can comprise individual words made up of letters, individual words comprising symbols, individual groups of numbers, individual words comprising combinations of letters, symbols, and/or numbers, as well as all other individual word forms, etc. A "printed page" is considered to be one side of a sheet of printing media.

A "multi-term inclusive query" has at least two terms separated by inclusive operators (such as spaces, commas, semicolons, Boolean operators, or other operators) that require that at least two different terms be in the document (or that a single term be repeated within a specified distance). Therefore, Boolean operators such as "and", "within/#" (where # represents a number of words, characters, or paragraphs) or other operators that require both of two different terms to be included within the document are used with embodiments herein. Multi-term inclusive queries are especially useful with embodiments herein because conventional search engines may miss different terms that occur close to each other, but that are separated by being printed on different pages (adjacent pages) because conventional search engines only perform multi-term inclusive queries within printed pages. To the contrary, as explained below, the present embodiments search for terms that span adjacent pages (and potentially multiple adjacent pages).

The search engine used in item 102 produces preliminary search results referred to herein as "search term matches" that identify each individual occurrence of each search term within the multi-term search, as shown in item 104. These search term matches 104 identify page locations within the printed publications (or hyperlinked documents) where individual terms within the multi-term inclusive query appear. Thus, each individual "search term match" 104 represents a single occurrence of only one term in the multi-term inclusive query. As shown in item 106, the process then checks each "search term match" to determine if other terms in the query are in close enough proximity to allow the search term match to remain in the final search results that are eventually reported back to the user.

Depending upon preferences, the users can be allowed to specify whether the different terms must occur on immediately adjacent pages (e.g., one page before or one page after) or whether the different terms can occur within a given number of pages (e.g., 2, 3, 5, 10, etc.). Similarly, embodiments herein can allow users to specify a number of words, characters, paragraphs, in which the different terms must occur to be valid search results). Such preferences are acquired from the users through the graphic user interface that is discussed below with respect to FIG. 2.

More specifically, in item 106 the method determines whether the terms of each "search term match" are within "predetermined proximities" of other terms found in the multi-term inclusive query. As used herein, these predetermined proximities are defined as 1) a term within a search term match being on the same page of the printed publications as at least one of the other terms in the multi-term inclusive query and/or 2) the term within the search term match being within a predetermined number of pages of the printed publications of at least one of the other terms in the multi-term inclusive query.

In alternative embodiments, item 106 determines whether terms within the search term matches are within predetermined proximities of other terms in the multi-term inclusive query by determining whether the search term matches are within a predetermined count of the other terms in the multi-term inclusive query. The counts span adjacent pages of the printed publications. More specifically, the counts that span the adjacent pages comprise a count of items from a term on one page to the beginning or end of that page, plus a count of items from a term on a second page adjacent to the first page to the beginning or end of the second page, so as to include a count of all terms between the terms in the counts that span adjacent pages of the printed publications.

Thus, embodiments herein look at all search term matches on all pages of a given document within the electronic concordance 100. Then, in addition to determining if at least two of the different terms (two different search term matches) appear on a single page, the embodiments herein look at each page that includes at least one search term match and then look at adjacent pages (as limited by the user preferences, discussed above) to see if at least one other search term match occurs on an adjacent page or adjacent pages. This allows embodiments herein to catch query matches that would be missed by conventional searches, which limit their proximity calculations to distances within a given printed page.

If hyperlinked documents are being searched, these predetermined proximities are similar in concept, but are defined as 1) a term within a search term match being on the same hyperlinked page as at least one of the other terms in the multi-term inclusive query, and/or 2) the term within the search term match being within a predetermined number of hyperlink pages of at least one of the other terms in the multi-term inclusive query. Adjacent hyperlinked pages each have hyperlinks that directly link to each other, without linking to or through intervening pages. The hyperlink comprises a graphical item a user activates with a single user input action (e.g., single click) to move from one hyperlinked page to an adjacent hyperlinked page.

As shown in item 108, the method then eliminates the search term matches that do not comprise terms that appear within the predetermined proximities from the preliminary search results (and keeps those search term matches that do, in item 110) to produce final search results 112, and reports the final search results to the user in item 114.

Figure 2:
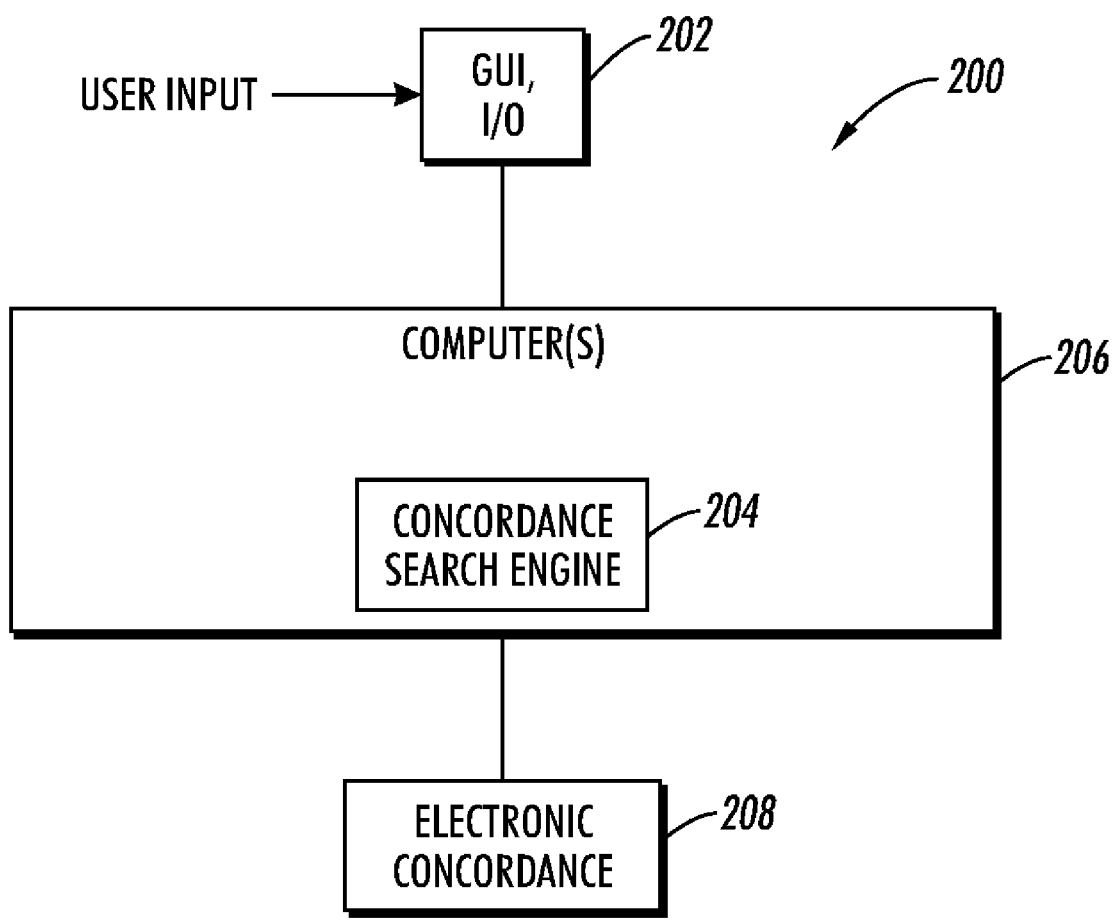
FIG. 2 is a schematic representation of a system according to embodiment herein.

As shown in FIG. 2, embodiments herein also comprise a system 200 that uses one or more computers 206. Computers are readily available devices produced by manufactures such as International Business Machines Corporation, Armonk N.Y., USA and Apple Computer Co., Cupertino Calif., USA. Such computers commonly include input/output devices, power supplies, processors, electronic storage memories, wiring, etc., the details of which are omitted herefrom to allow the reader to focus on the salient aspects of the embodiments described herein.

In the system 200, there is at least one concordance search engine 204 running on one or more of the computers 206. The concordance search engine 204 is adapted to receive user input (through, for example, a graphic user interface and/or input/output device (GUI, I/O) 202) to search the electronic concordance 208 as discussed above. For details of concordance identifiers see U.S. Patent Publications 2007/0005566, 2006/0149558, and 2005/0243369 the complete disclosures of which are incorporated herein by reference.

As used herein, the "printed publication" comprises a tangible object that includes markings (text) on physical sheets (printing media) that are capable of being read and/or recognized by humans. The printed publication is contrasted with an electronic document that is stored on some form of electronic media (as charges, etc.) that can be read only by a machine and that must be converted into human readable text by the machine and displayed to the user by the machine on some form of electronic display device. The printed publication can comprise any type of physical hard copy item including a book, pamphlet, newspaper, magazine, etc.

The word "printer" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. Printers are readily available devices produced by manufactures such as Xerox Corporation, Stamford, Conn., USA and Hewlett Packard Company, Palo Alto Calif., USA. Such printers commonly include input/outputs, power supplies, processors, media movement devices, marking devices etc., the details of which are omitted herefrom to allow the reader to focus on the salient aspects of the embodiments described herein.

Thus, as shown above, conventional electronic concordance searching is limited to the inclusive occurrence of different terms within a single printed page, as electronic concordance documents treat each printed page individually for searching purposes, because of the physically separate nature of each printed page. However, with embodiments herein, the searching can span one or more adjacent pages of the printed publication. In addition to determining if at least two of the different terms (two different search term matches) appear on a single page, the embodiments herein look at each page that includes at least one search term match and then look at adjacent pages (as limited by the user preferences, discussed above) to see if at least one other search term match occurs on an adjacent page or adjacent pages. This allows embodiments herein to catch query matches that would be missed by conventional searches, (which limit their proximity calculations to distances within a given printed page).

Thus, an electronic concordance is generated for a document that contains each word in the document associated with each page number that the word appears on. When multiple keywords are searched for in the concordance, hits are generated for keywords on pages that intersect within one page of each other, e.g., a fuzzy intersection.

Looser matches can be provided with embodiments herein where hits are generated when keywords are within N pages of each other. The lookup software provides a page range for each hit. The user interface allows the user to specify exact, all on the same page, hits, or fuzzy hits. The embodiments herein also extend to loose hypertext searches where the fuzzy intersection allows keywords to span a page, and the pages that are hyperlinked to/from that page. In that case the concordance contains the keyword and the URL the word is found on, the lookup software provides groups of URLs involved in each hit.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A computer-implemented method comprising:

providing an electronic document via a computer comprising text and concordance data, wherein said concordance data identifies locations where said text appears on hyperlinked pages, such as web pages;

performing a computerized search of said electronic document via said computer based on a multi-term inclusive query to produce preliminary search results comprising search term matches, where each search term match only includes a single term, and wherein said search term matches identify page locations within said hyperlinked pages where individual terms within said multi-term inclusive query appear;

determining whether terms within said search term matches are within predetermined proximities of other terms in said multi-term inclusive query via said computer, wherein said predetermined proximities comprise said term within said search term match being within a predetermined number of hyperlink pages of at least one of said other terms in said multi-term inclusive query, wherein said predetermined number of hyperlink pages each have hyperlinks that directly link between each other;

eliminating said search term matches via said computer that do not comprise terms that appear within said predetermined proximities from said preliminary search results to produce final search results; and reporting said final search results via said computer.

2. The method according to claim 1, wherein said hyperlinked pages comprise a hyperlink comprising a graphical item a user activates with a single user input action to move between hyperlinked pages.

3. The method according to claim 1, wherein said hyperlink pages comprise network documents that are linked together.

4. The method according to claim 1, wherein said concordance data comprises said search term matches and the Uniform Resource Locator (URL) the search term match is found on.

5. The method according to claim 1, wherein said hyperlinked pages comprise a hyperlink comprising a graphical item a user activates with a single user input action to move between adjacent hyperlinked pages in one of network documents and web pages.

6. A computer-implemented method comprising:

providing an electronic document via a computer comprising text and concordance data, wherein said concordance data identifies locations where said text appears on hyperlinked pages, such as web pages;

performing a computerized search of said electronic document via said computer based on a multi-term inclusive query to produce preliminary search results comprising search term matches, where each search term match only includes a single term, and wherein said search term matches identify page locations within said hyperlinked pages where individual terms within said multi-term inclusive query appear;

determining whether terms within said search term matches are within predetermined proximities of other terms in said multi-term inclusive query via said computer, wherein said predetermined proximities comprise said term within said search term match being within adjacent hyperlink pages of at least one of said other terms in said multi-term inclusive query, wherein said adjacent hyperlink pages each have hyperlinks that directly link to each other;

eliminating said search term matches via said computer that do not comprise terms that appear within said predetermined proximities from said preliminary search results to produce final search results; and reporting said final search results via said computer.

7. The method according to claim 6, wherein said hyperlinked pages comprise a hyperlink comprising a graphical item a user activates with a single user input action to move between hyperlinked pages.

8. The method according to claim 6, wherein said hyperlink pages comprise network documents that are linked together.

9. The method according to claim 6, wherein said concordance data comprises said search term matches and the Uniform Resource Locator (URL) the search term match is found on.

10. The method according to claim 6, wherein said hyperlinked pages comprise a hyperlink comprising a graphical item a user activates with a single user input action to move between adjacent hyperlinked pages in one of network documents and web pages.

11. A computer-implemented method comprising:

providing an electronic document via a computer comprising text and concordance data, wherein said concordance data identifies locations where said text appears on hyperlinked pages, such as web pages;

performing a computerized search of said electronic document via said computer based on a multi-term inclusive query to produce preliminary search results comprising search term matches, where each search term match only includes a single term, and wherein said search term matches identify page locations within said hyperlinked pages where individual terms within said multi-term inclusive query appear;

determining whether terms within said search term matches are within predetermined proximities of other terms in said multi-term inclusive query via said computer, wherein said predetermined proximities comprise said term within said search term match being within a predetermined number of hyperlink pages of at least one of said other terms in said multi-term inclusive query, wherein said predetermined number of hyperlink pages each have hyperlinks that directly link between each other;

eliminating said search term matches via said computer that do not comprise terms that appear within said predetermined proximities from said preliminary search results to produce final search results; and reporting said final search results via said computer, wherein said hyperlinked pages comprise a hyperlink comprising a graphical item a user activates with a single user input action to move between adjacent hyperlinked pages.

12. The method according to claim 11, wherein said hyperlink pages comprise one of network documents and web pages that are linked together.

13. The method according to claim 11, wherein said concordance data comprises said search term matches and the Uniform Resource Locator (URL) the search term match is found on.

* * * * *